United States Patent

Harms et al.

(10) Patent No.: US 12,085,510 B2
(45) Date of Patent: Sep. 10, 2024

(54) DEVICE FOR WAVEFRONT ANALYSIS AND MICROSCOPIC IMAGING SYSTEMS COMPRISING SUCH ANALYSIS DEVICES

(71) Applicant: IMAGINE OPTIC, Orsay (FR)

(72) Inventors: Fabrice Harms, Orsay (FR); Xavier Levecq, Gif-sur-Yvette (FR)

(73) Assignee: IMAGINE OPTIC, Orsay (FR)

( * ) Notice: Subject to any disclaimer, the term of this patent is extended or adjusted under 35 U.S.C. 154(b) by 209 days.

(21) Appl. No.: 17/426,398

(22) PCT Filed: Jan. 31, 2020

(86) PCT No.: PCT/EP2020/052403
§ 371 (c)(1),
(2) Date: Jul. 28, 2021

(87) PCT Pub. No.: WO2020/157265
PCT Pub. Date: Aug. 6, 2020

(65) Prior Publication Data
US 2022/0099577 A1 Mar. 31, 2022

(30) Foreign Application Priority Data

Feb. 1, 2019 (FR) ...................................... 1901011

(51) Int. Cl.
G01N 21/64 (2006.01)
G02B 21/06 (2006.01)
G02B 21/16 (2006.01)
G02B 21/36 (2006.01)
H04N 23/56 (2023.01)

(52) U.S. Cl.
CPC ......... *G01N 21/6458* (2013.01); *G02B 21/06* (2013.01); *G02B 21/16* (2013.01);
(Continued)

(58) Field of Classification Search
None
See application file for complete search history.

(56) References Cited

U.S. PATENT DOCUMENTS 855,730 A 6/1907 Azucena et al.
2002/0033947 A1* 3/2002 Grunwald .......... G02B 27/0977
356/450

(Continued)

FOREIGN PATENT DOCUMENTS

JP 2014-521093 A 8/2014
JP 2015-060202 A 3/2015

OTHER PUBLICATIONS

Ji, N.; "Adaptive optical fluorescence microscopy"; Nature Methods, vol. 14, No. 4, Apr. 2017, pp. 374-380 (7 pages).

(Continued)

Primary Examiner — Clifford Hilaire
(74) Attorney, Agent, or Firm — Osha Bergman Watanabe & Burton LLP

(57) ABSTRACT

A device for analysing a wavefront may be connected to a fluorescence microscopy imaging system with optical sectioning, equipped with a microscope objective including a pupil in a pupil plane, the analysis device including a two-dimensional detector including a detection plane; a two-dimensional arrangement of microlenses, arranged in an analysis plane, each microlens forming, on the detection plane, when the analysis device is connected to the microscopic imaging system, an image of an object situated in a focal plane of the microscope objective, with a given analysis field; an optical relay system optically conjugating the analysis plane and the pupil plane; a field diaphragm positioned in a plane optically conjugated with the plane of detection, and defining said analysis field; a processing unit that determines, based on the set of images formed by the microlenses, a two-dimensional map of a characteristic parameter of the wavefront in said analysis plane.

13 Claims, 8 Drawing Sheets

(52) U.S. Cl.
CPC .......... *G02B 21/365* (2013.01); *H04N 23/56* (2023.01); *G01N 2201/06113* (2013.01)

(56) References Cited

U.S. PATENT DOCUMENTS

| | | | | |
|---|---|---|---|---|
| 2005/0270667 | A1* | 12/2005 | Gurevich | G02B 13/06 359/754 |
| 2006/0202104 | A1* | 9/2006 | Gurevich | H01L 27/14678 257/E27.147 |
| 2006/0250607 | A1* | 11/2006 | Takahashi | G03F 7/70258 356/124 |
| 2011/0279778 | A1* | 11/2011 | Saito | A61B 3/14 250/201.9 |
| 2014/0270565 | A1* | 9/2014 | Poyneer | G06T 5/003 382/260 |
| 2015/0060965 | A1* | 3/2015 | Gidon | H01L 27/1464 257/292 |
| 2015/0362713 | A1 | 12/2015 | Betzig et al. | |
| 2016/0135680 | A1* | 5/2016 | Anderson | G01J 9/02 351/246 |
| 2016/0349110 | A1 | 12/2016 | Markov et al. | |
| 2019/0204578 | A1* | 7/2019 | Fahrbach | G02B 27/0075 |
| 2020/0297209 | A1* | 9/2020 | Katashiba | A61B 3/1015 |

OTHER PUBLICATIONS

Booth, M. J. et al.; "Adaptive optics for fluorescence microscopy"; Fluorescence Microscopy: Super-resolution and other Novel Techniques, A. Cornea et al., Academic Press, 2014, pp. 1-32 (32 pages).

Lawrence, K. et al.; "Scene-based Shack-Hartmann Wavefront Sensor for Light-Sheet Microscopy"; Imaging and Applied Optics, 2018, (2 pages).

International Search Report for corresponding International Application No. PCT/EP2020/052403, dated May 13, 2020 (8 pages).

Written Opinion for corresponding International Application No. PCT/EP2020/052403, dated May 13, 2020 (13 pages).

R. Jorand et al; "Deep and Clear Optical Imaging of Thick Inhomogeneous Samples"; PLOS One, vol. 7, No. 4, p. e35795; Apr. 25, 2012 (9 pages).

Imagine Optics; HASO Imagine Optics, Retrieved from Internet on Nov. 19, 2019; Retrieved from Internet: URL: https://axiomoptics.com/Brochures/haso3_web.pdf(3 pages).

L. Poyneer et al; "Spatially filtered wave-front sensor for high-order adapative optics"; Journal of Optical Society of America, vol. 21, No. 5, pp. 810-819; May 1, 2004 (10 pages).

M. Hattori et al; "The development of an adaptive optics system and its application to biological microscope"; Proceedings of SPIE, vol. 10021, pp. 1002106-1-1002106-7; Oct. 31, 2016 (7 pages).

J. Won Cha et al; "Shack-Hartmann wavefront-sensor-based adaptive optics system for multiphoton microscopy"; Journal of Biomedical Optics, vol. 15, No. 4, pp. 046022-1-046022-10; Jul. 1, 2010 (10 pages).

Office Action issued in counterpart European Patent Application No. 20 706 107.8 dated Aug. 24, 2023 (6 pages).

Michau V et al.; "Shack-Hartmann wavefront sensing wit extended sources"; Laser-based Micro-and Nanopackaging and Assembly II, vol. 6303,; Aug. 31, 2006 (12 pages).

Office Action issued in counterpart Japanese Patent Application No. 2021-544776 mailed on Dec. 5, 2023 (10 pages).

* cited by examiner

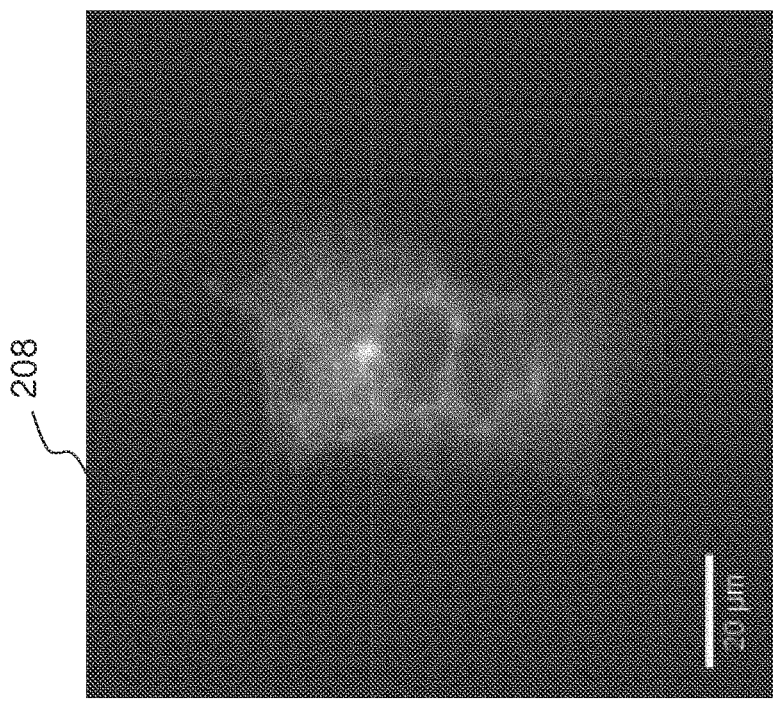
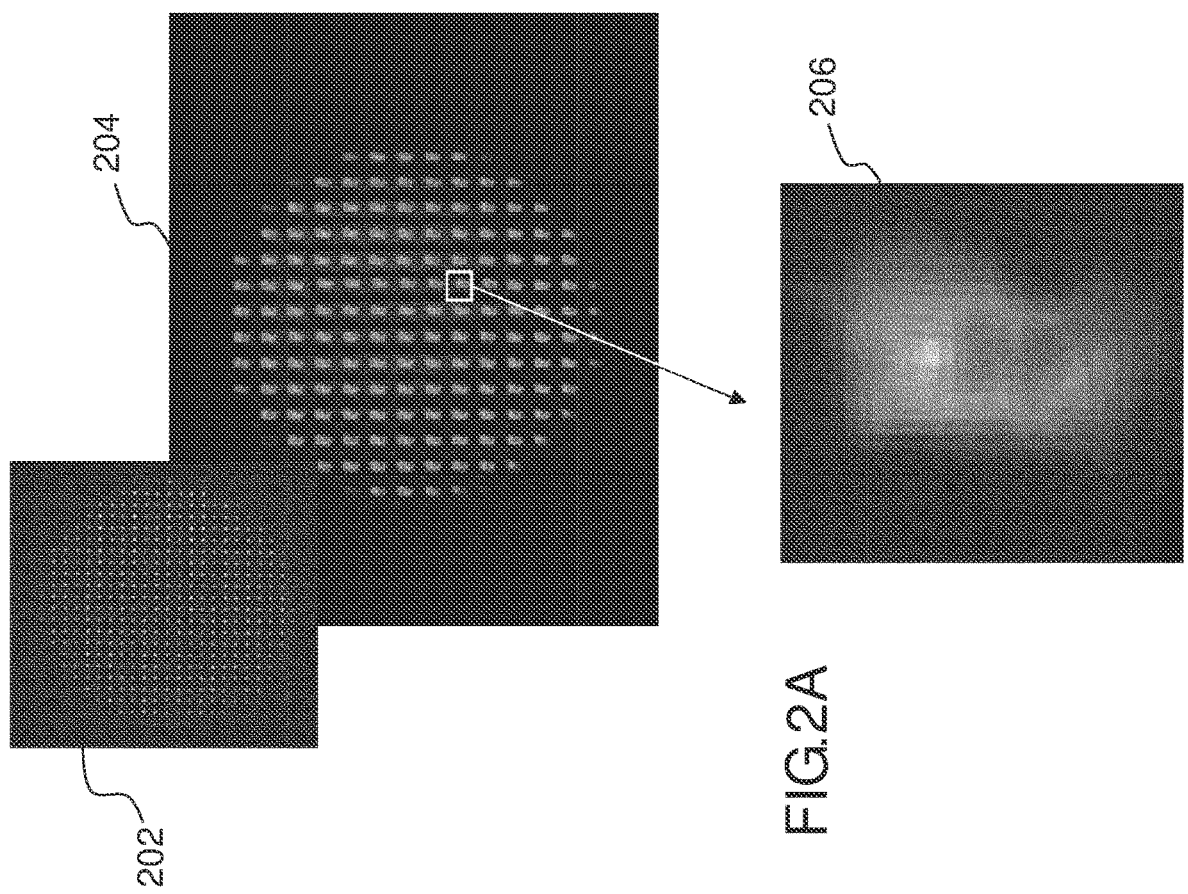
FIG.2A
FIG.2B

DEVICE FOR WAVEFRONT ANALYSIS AND MICROSCOPIC IMAGING SYSTEMS COMPRISING SUCH ANALYSIS DEVICES

The present invention contains a description and a set of claims. It also contains figures, an abstract and a figure for the abstract.

TECHNICAL FIELD OF THE INVENTION

The present description relates to wavefront analysis devices, microscopic imaging systems comprising such analysis devices and microscopic imaging methods using such analysis devices. The present description more specifically relates to systems and methods for fluorescence microscopic imaging with optional sectioning, for example, light-sheet or multiphoton systems and methods for fluorescence microscopic imaging.

PRIOR ART

In microscopy, in particular high-resolution imaging, the quality of the image in terms of resolution and of contrast is directly associated with the incident wavefront on the imaging detector, for example, a camera. The wavefront, i.e. the surface of equal phase of a wave, is, in a microscopic imaging system, disrupted both by the optical defects introduced by the optical elements of the imaging system, such as, for example, production defects in the optical elements, alignment defects, variations in the refractive index between the immersion medium of the microscope objective lens and the object, and by the object itself. This is particularly true in the case of transparent or partially transparent biological objects, when producing an image corresponding to a plane deep in the object indeed, in biological objects, the spatial distribution of the refractive index is inhomogeneous at the microscopic scale due to the complexity of the biological structures. The rays originating from different points of a plane deep in the object are therefore disrupted by the successive layers passed through in the object. The wavefront originating from each of these points is thus different from a perfect wavefront, with said perfect wavefront being defined as a flat or spherical wavefront and the corresponding image is degraded as a result.

Adaptive optics (AO) is a technique for dynamically modifying a wavefront and, particularly when the technique is used in an imaging system, for correcting any defects of the wavefront at each point in order to restore the quality of the images produced by said system. Typically, an AO system comprises three main elements: a device for analyzing (or measuring) the wavefront, a device for correcting the wavefront, and a control device for converting a parameter originating from the analysis of the wavefront into an optimal correction to be applied by the correction device. When it is used in microscopic imaging, the AO technique allows imaging performance to be significantly improved by correcting the optical defects introduced by the optical system and the object of interest, according to various implementations, such as those described, for example, in "*Adaptive optics for fluorescence microscopy*", by M. J. Booth et al. [Ref. 1].

The methods for implementing AO in microscopic imaging that have been developed to date are all based on the use of a wavefront correction device that allows local modification of the phase of an optical wave. Among correction devices, deformable mirrors, liquid crystal modulators (or SLM "Spatial Light Modulator") or even deformable lenses are known, for example. A deformable mirror comprises, for example, a reflective membrane and a set of actuators for locally deforming the membrane in a controlled manner.

The methods for implementing AO in microscopic imaging nevertheless differ in terms of the methods for measuring optical defects, in light of the correction. Two major categories can be distinguished for measuring optical defects: the indirect measurement methods based on the analysis of the image produced by the microscope by means of quality criteria representing the quality of the wavefront that led to the formation of said image, and the methods for direct measurement of optical defects by means of wavefront analyzers, for example, Shack-Hartmann type analyzers.

The first approach (indirect measurement) enables simplified, and therefore less expensive, instrumental implementation due to the lack of a wavefront analyzer. However, it is based on an overall optimization that requires the use of iterative algorithms, the convergence reliability, the execution speed and the calibration of which are limiting, particularly in the case of dynamic imaging objects.

Thus, particularly for microscopic imaging of biological objects, the methods that are based on the direct measurement of optical defects coupled with wavefront correction have proven their ability to achieve very good correction of the optical defects introduced by the imaging system and the object, and to achieve a substantial improvement in the contrast and the resolution of the images. Such methods are described, for example, in the review article by N. Ji, "*Adaptive optical fluorescence microscopy*" [Ref. 2].

However, the direct measurement of optical defects approach remains difficult to implement. Indeed, a "point source" emitting a single wavefront generally needs to be provided for this measurement. Currently, the most efficient approaches involve optically inducing or isolating a light emitting volume (also called "artificial star" or "guide star") within the image. According to a first example, the guide star is created by using fluorescent beads, the size of which is substantially equal to the diffraction limit of the microscope objective lens that is used, placed in the object of interest, as described in patent U.S. Pat. No. 855,730 B2 [Ref. 3], which requires a substantial modification of the object. According to a second example, described in published patent application US 2015/0362713 [Ref. 4], the guide star is created using an ultrashort laser locally generating a 2-photon fluorescence emission volume in the object of interest.

These approaches require complex implementation in microscopic imaging, whether this is in terms of the preparation of the object of interest or of the instrumental design. Furthermore, the use of a point source as a wavefront source only makes the measurement of the optical defects induced by the object, and therefore the corresponding AO correction, valid over a field-of-view that is limited by the isoplanetic patch of the object, i.e. the field-of-view on the imaging plane of the object for which the optical defects vary by so little that the corresponding image does not exhibit any significant degradation. However, the majority of biological objects of interest in high-resolution microscopy are made up of multiple microscopic structures corresponding to significant phase fluctuations: the isoplanetic patch is generally limited to one hundred square microns, which represents a significant limitation for the spatio-temporal high-resolution study of large structures, such as, for example, the study of neural networks in the field of neuroimaging.

Most recently, an AO method was proposed in a "light-sheet" type microscopic imaging system that did not require the use of a point source for measuring optical defects, as described in the article by K. Lawrence et al., "*Scene-based Shack-Hartmann wavefront sensor for light-sheet microscopy*" [Ref. 5]. To this end, a Shack-Hartmann type wavefront analyzer is proposed, in which each microlens of the analyzer forms an image of an extended object. The wavefront is analyzed by means of cross-correlation or "intercorrelation" operations between the images formed by the different microlenses, allowing a two-dimensional map of the local gradients of the wavefront to be obtained.

However, the applicant has revealed limitations in the previously described method. Indeed, in practice, overlaps are found between the images formed by the microlenses, with these overlaps being able to induce errors in the intercorrelation computations and inaccuracies in the analysis of the wavefront. Furthermore, the described method only allows an analysis of the average wavefront to be carried out on a given field-of-view, without taking into account the isoplanetic patch of the object.

The aim of the present description is to particularly propose a wavefront analysis device allowing all or some of the aforementioned limitations to be overcome.

SUMMARY OF THE INVENTION

According to a first aspect, the present description relates to a wavefront analysis device, configured to be connected to a fluorescence microscopic imaging system with optical sectioning, said microscopic imaging system being equipped with a microscope objective lens comprising a pupil in a given pupil plane. The analysis device according to the present description comprises:
  a two-dimensional detector comprising a detection plane;
  a two-dimensional arrangement of microlenses arranged in an analysis plane, each microlens being configured to form, on the detection plane when the analysis device is connected to the microscopic imaging system, an image of an object located in a focal plane of the microscope objective lens, with a given analysis field-of-view;
  an optical relay system configured to optically conjugate the analysis plane and the pupil plane of the microscope objective lens;
  a field diaphragm positioned in a plane optically conjugated with the detection plane and configured to define said analysis field-of-view;
  a processing unit configured to determine, on the basis of the set of images formed by the microlenses, a two-dimensional map of a characteristic parameter of the wavefront in said analysis plane.

A wavefront within the meaning of the present description is the surface of equal phase of a light wave.

According to one or more embodiments, a characteristic parameter of the wavefront comprises a local gradient (or local slope) in two dimensions of the wavefront in the analysis plane.

According to one or more embodiments, determining a two-dimensional map of the local gradient involves determining variations of the positions of the images formed by the microlenses, with the variations being measured in relation to reference positions of images formed with a reference wavefront, for example, a flat wavefront. For example, the variations of the positions of the images formed by the microlenses are determined by cross-correlation operations between the images.

According to one or more embodiments, a characteristic parameter of the wavefront further comprises a local deviation of the wavefront intercepted in the analysis plane in relation to a reference wavefront corresponding to a light wave that does not have any optical defects, for example, a flat wavefront. The two-dimensional map of said local deviations of the wavefront in relation to a reference wavefront can be obtained on the basis of the two-dimensional map of the local slopes of the wavefront.

The applicants have shown that the wavefront analysis device described thus would enable, compared to the known devices of the prior art, a significant improvement in the precision of the analysis, whilst avoiding the generation of a guide star. Indeed, the field diaphragm arranged thus in the wavefront analysis device allows the size of the image formed by each microlens on the detection plane to be controlled and allows the overlap between two images formed by two adjacent microlenses to be limited, yet without limiting the size of the field-of-view imaged by the microscopic imaging system to which said wavefront analysis device is connected.

Within the meaning of the present description "microlens" refers to any focusing optical element with lateral dimensions (i.e. measured in the analysis plane) that are less than or equal to 5 mm, having a focal distance that is less than or equal to 20 mm and a pupil size that is less than or equal to 5 mm. A microlens can comprise, for example, a transparent material with two surfaces, at least one of which is not flat, with the non-flat surface being, for example, a convex surface, for example, a spherical surface.

According to one or more embodiments, said microlenses of the microlens matrix are identical, for example, arranged in a two-dimensional matrix.

According to one or more embodiments, said microlenses of the microlenses array are joined together and have a square pupil.

According to one or more embodiments, the field diaphragm is a transmission field diaphragm and comprises, for example, an aperture with given finite dimensions. According to one or more embodiments, the field diaphragm is a reflection field diaphragm and comprises a reflective element with given finite dimensions. Throughout the remainder of the description, the shape and/or the dimensions of the field diaphragm can refer, unless otherwise stated, both to the shape and/or to the dimensions of an aperture for a transmission field diaphragm and to the shape and/or to the dimensions of a reflective element for a reflection field diaphragm.

According to one or more embodiments, the shape of the field diaphragm is similar to the shape of a pupil of a microlens.

According to one or more embodiments, the field diaphragm has dimensions that are determined so that two adjacent images formed by two adjacent microlenses do not overlap.

In particular, according to one or more embodiments, the analysis device further comprises one or more optical element(s) allowing the optical conjugation to be carried out between the plane of the field diaphragm and the detection plane and the dimensions of the field diaphragm are less than or equal to the dimensions of a microlens divided by the optical magnification defined by the one or more optical element(s).

According to one or more embodiments, said one or more optical element(s) comprise(s) said optical relay system.

Thus, according to one or more embodiments, for a matrix of square, joined microlenses, each microlens of which has a side size $d_m$, if said optical magnification is G, the field diaphragm is square and the size thereof is $d_m/G$.

According to one or more embodiments, the dimensions of the field diaphragm are less than or equal to an analysis field-of-view corresponding to a given isoplanetic patch.

An isoplanetic patch is defined as a finite field-of-view of the object, within which the optical defects vary by a sufficiently small amount. Thus, wavefront measurements originating from zones that are taken at any point of an isoplanetic patch have, in a given analysis plane, the same wavefront defects, to the nearest fraction of an analysis wavelength, for example, to the nearest quarter of the analysis wavelength. In practice, this means that the same correction can be applied for correcting the wavefront throughout the entire isoplanetic patch.

According to one or more embodiments, the field diaphragm has variable dimensions. It is thus possible to vary the size of the analysis field-of-view, which allows an isoplanetic patch of the object to be determined. For example, an isoplanetic patch of the object is determined by carrying out a series of wavefront measurements, with each measurement being carried out for a field diaphragm size that decreases from the maximum size, the isoplanetic patch corresponding to the largest size from which the measured wavefront does not exhibit a significant change, i.e. no change that is greater than a fraction of the analysis wavelength, for example, no change that is greater than a quarter of the analysis wavelength.

According to one or more embodiments, the size varies between a size whereby two adjacent images formed by two adjacent microlenses do not exhibit any overlap and a smaller size.

According to one or more embodiments, the field diaphragm is square, and the dimension of the side is variable.

According to one or more embodiments, the position of the field diaphragm is variable in said plane conjugated with the detection plane of the analysis device. It is thus possible to measure the wavefront as a function of the transverse position of the analysis field-of-view in relation to the focal plane of the microscope objective lens, which allows, if applicable, an optimal correction to be applied as a function of said position using a system for correcting optical defects.

Indeed, for a complex object, the size of the isoplanetic patch is limited. The microscopic imaging system images a imaging field-of-view which has a given size. The analysis field-of-view (of the analyzer) is typically smaller, and the isoplanetic patch is possibly even smaller. By moving the diaphragm, it is possible to measure the optical defects of the wavefront at different positions of the imaging field-of-view, and even to determine the isoplanetic patch at these different positions of the imaging field-of-view.

According to one or more embodiments, the field diaphragm has a spatially structured optical transmission (respectively an optical reflection). The structuring of the optical transmission (respectively of the optical reflection) allows additional intensity patterns to be revealed in the images formed by the microlenses, which can improve the intercorrelations between the images when processing images.

According to one or more embodiments, said optical transmission (respectively optical reflection) is structured to include a regular alternation of transparent zones and of opaque zones in one direction (respectively a regular alternation of reflective zones and of non-reflective zones in one direction), according to a spatial frequency that is greater than or equal to the cut-off frequency of the microlenses of the microlenses array. This particular configuration allows additional intensity patterns to be revealed in the images of the object formed by the microlenses, which patterns are the result of a Moiré phenomenon. This configuration is particular advantageous in the case of the object only containing structures for which the spatial frequencies are greater than the cut-off frequency of the microlenses of the microlenses array.

According to one or more embodiments, the two-dimensional detector comprises a two-dimensional arrangement of elementary detectors and a diffraction spot of a microlens comprises, in one direction, between 0.2 and 5 elementary detectors, advantageously between 0.2 and 2 elementary detectors in one direction. The dimension of a diffraction spot of a microlens in one direction is defined by the distance separating the 2 first intensity minima located on either side of the maximum intensity. The applicants have shown that this particular configuration represented a good compromise between the wavefront measurement precision and the size of the analysis field-of-view.

According to a second aspect, the present description relates to fluorescence microscopic imaging systems with optical sectioning of a volumetric and fluorescent object comprising a wavefront analysis device according to the first aspect.

According to one or more embodiments, a fluorescence microscopic imaging system with optical sectioning of a volumetric and fluorescent object according to the present description comprises:
  an illumination path of the object;
  an imaging path of an optical section of the object, comprising a microscope objective lens with a pupil in a pupil plane and an imaging detector comprising an imaging detection plane, said optical section being superimposed, during operation, with a focal plane of said microscope objective lens;
  an analysis path comprising said microscope objective lens and a wavefront analysis device as claimed in any one of the preceding claims, configured to analyze a wavefront originating from the object, the analysis plane and the detection plane of the analysis device being respectively conjugated with the pupil plane and the focal plane of the microscope objective lens;
  a beam splitter element for splitting said device for analyzing optical defects from the imaging path.

In the present description, fluorescence is understood to be the emission of light from an object resulting from light excitation by absorption of photons in a given spectral absorption band. The emission of fluorescence light can result from a one photon linear mechanism or from a two or more photons non-linear mechanism, with this mechanism typically resulting from the interaction of the absorbed light with a fluorescent element forming the object or with a fluorescent element added to the object such as, for example, in the case of a biological object, a fluorescent protein.

A volumetric and fluorescent object thus comprises any object comprising microscopic structures, provided with intrinsic fluorescence properties or made fluorescent by adding a "marker". A volumetric and fluorescent object comprises, for example, a biological object such as a cell, a cell culture, an animal, with these biological objects being provided with fluorescence properties, whether they are intrinsically constituents of the object or are induced by adding fluorescent elements. Among the volumetric and fluorescent objects of interest, the fluorescent neuronal structures of an animal brain are particularly cited within the context of neuroimaging studies.

A fluorescence microscopic imaging system with optional sectioning is, within the meaning of the present description, an imaging system equipped with a microscope objective lens, in which only the fluorescence light originating from an optical section of the object, perpendicular to an optical axis of the microscope objective lens, is detected. An optical section can be created by different methods for illuminating the object that are known in the prior art. The thickness of an optical section can be of the order of or less than the depth of field of the microscope objective lens.

The wavefront analysis involves determining a two-dimensional map of a characteristic parameter of the wavefront measured in the analysis plane.

The characteristic parameter comprises, for example, a local gradient (or local slope) in two dimensions of the wavefront in the analysis plane.

According to one or more embodiments, the processing unit is configured to determine, on the basis of the two-dimensional map of the local slopes, a two-dimensional map of the deviation of said wavefront relative to a reference wavefront corresponding to a defect-free light wave, for example, a flat wavefront. The two-dimensional map of the deviation of said wavefront relative to a reference wavefront can be used to determine a property of the object, for example, the presence and the distribution of inhomogeneities within the object. For example, in the case whereby the object is a cell, the refractive index of the cell nucleus differs from that of the cytoplasm, a two-dimensional map of the deviation of the wavefront relative to a reference wavefront can allow the cell nucleus, and the values of the wavefront at each point, to be visualized in order to deduce specific properties of the cell therefrom, such as its physiological state, whereas the intensity information originating from the only imaging path of the object does not allow such information to be obtained.

According to one or more embodiments, the imaging path further comprises a unit for processing signals originating from the imaging detector. Of course, in practice, the processing units of the analysis path and of the imaging path can be consolidated within the same unit.

According to one or more embodiments, the beam splitter element is of the dichroic type, i.e. it allows the incident light to be split into a first spectral band far reflected light and into a second spectral band different from the first spectral band for transmitted light.

According to one or more embodiments, the dichroic type beam splitter element allows said two spectral bands to be split toward the imaging path and toward the analysis path.

According to one or more embodiments, the illumination path comprises at least two light sources, with one of the sources being used for fluorescence excitation in the imaging path, and another source being used for fluorescence excitation for in analysis path, said path being configured so as to produce structured lighting of the object in a two-dimensional pattern.

According to one embodiment, the two-dimensional pattern is cross-shaped.

This implementation allows, in the case of an object producing a uniform or only slightly contrasted fluorescence emission, images to be obtained in the detection plane of the wavefront analysis device that are produced by the microlenses of the wavefront analysis device in accordance with a geometry that facilitates the cross-correlation computation between said images.

According to one or more embodiments, the microscopic imaging system according to the second aspect further comprises a wavefront correction device comprising a correction plane optically conjugated with the pupil plane of the microscope objective lens. Said correction plane is included in the analysis path and the correction device is configured to correct a wavefront originating from the object and analyzed by said analysis device.

Wavefront correction is understood to be the local modification of the phase of the wave in the correction plane aiming to obtain a reference wavefront. Depending on the purpose of the wavefront correction method, the reference wavefront can be a flat wavefront, such as, for example, for optimizing the performance of an imaging system, or a specific wavefront.

A wavefront correction device comprises, for example, a deformable mirror generally made up of a membrane and of actuators allowing the axial position of said membrane to be locally modified. The wavefront correction device can also comprise a "Spatial Light Modulator" (SLM), generally made up of a two-dimensional arrangement of liquid crystal cells coupled to electrodes for locally modifying the refractive index of said cells. The wavefront correction device can also comprise a deformable lens generally made up of active elements allowing the shape and/or the thickness of said lens to be locally modified.

According to one or more embodiments, the processing unit of the analysis device is configured to control the correction device as a function of the analysis of the wavefront in the analysis plane.

According to one or more embodiments, the fluorescence microscopic imaging system with optical sectioning is of the "light-sheet" type. The illumination path is then configured to form said optical section by transverse illumination of the object.

According to one or more embodiments, the "light-sheet" type fluorescence microscopic imaging system comprises a correction device and the correction plane of the correction device is common to the analysis path and to the imaging path. Correcting the wavefront by means of the correction device allows the quality of the image to be improved, particularly when the focal plane of the microscope objective lens is located deep in the object, thanks to the compensation of the optical defects induced by the inhomogeneities of the object between its surface and said focal plane.

According to one or more embodiments, the fluorescence microscopic imaging system is of the multiphoton type.

According to one or more embodiments, the illumination path of the multiphoton imaging system comprises:
one or more laser source(s) for emitting ultrashort pulses, said microscope objective lens allowing each pulse to be focused at a focusing point of a focal plane of said objective lens in order to form a multiphoton fluorescence emission;
a scanning device configured to transversely scan said focusing point.

According to one or more embodiments, the multiphoton fluorescence microscopic imaging system comprises a correction device and the correction plane is common to the analysis path and the illumination path. Correcting the wavefront by means of the correction device allows the focusing quality in the object to be improved, and consequently allows the fluorescence signal at each point of the image to be increased, thanks to the compensation of the optical defects induced by the inhomogeneities of the object between its surface and said focal plane as each pulse passes through.

According to a third aspect, the present description relates to methods for fluorescence microscopic imaging with optical sectioning implemented by systems according to the second aspect and the different embodiments thereof.

More specifically, the present description relates to a method for microscopic imaging of an object by means of a fluorescence microscopic imaging system with optical sectioning comprising:

illuminating the object along an optical section by means of an illumination path;

imaging said optical section of the object in an imaging detection plane of a two-dimensional imaging detector by means of an imaging path comprising a microscope objective lens with a pupil in a pupil plane and said imaging detector;

analyzing, in a given analysis plane, a wavefront originating from said optical section of the object by means of an analysis path comprising said microscope objective lens and a wavefront analysis device according to the first aspect, the analysis plane of the wavefront and the detection plane of the analysis device being respectively conjugated with the pupil plane and a focal plane of the microscope objective lens, the analysis path being split from the imaging path by means of a beam splitter.

According to one or more embodiments, analyzing the wavefront involves determining a two-dimensional map of a parameter of the wavefront, for example, determining a two-dimensional map of the local slopes of the wavefront.

According to one or more embodiments, the microscopic imaging method further comprises correcting a wavefront originating from said optical section of the object in a correction plane conjugated with a pupil plane of the microscope objective lens, said correction plane being positioned in the analysis path.

According to one or more embodiments, the beam splitter element is of the dichroic type, the imaging is carried out in a first spectral band and the analysis is carried out in a second spectral band, separate from the first spectral band.

This implementation is made possible, for example, by introducing two types of fluorescent elements into the object, and prevents the use of photons of the emission fluorescent light intended to form the image of the object for analyzing the wavefront, which is particularly critical in the case of weakly fluorescent objects, as is generally the case for biological objects.

According to one or more embodiments, the illumination of the object involves a first illumination for fluorescence excitation for the imaging path, and a second illumination for fluorescence excitation for the analysis path, with the second illumination producing structured lighting of the object in a two-dimensional pattern.

According to one or more embodiments, the two-dimensional pattern is cross-shaped.

According to one or more embodiments, the field diaphragm has variable dimensions and the microscopic imaging method further comprises analyzing the wavefront for different dimensions of the field diaphragm and determining at least one isoplanetic patch on the basis of the different analyses of the wavefront.

According to one or more embodiments, the position of the field diaphragm is variable in the plane of the field diaphragm and the microscopic imaging method further comprises analyzing the wavefront for different positions of the field diaphragm and determining a plurality of isoplanetic patches on the basis of the different analyses of the wavefront.

According to one or more embodiments, the microscopic imaging method further comprises the sequential correction of a wavefront originating from said optical section of the object in different zones of the field-of-view, as a function of said plurality of isoplanetic patches.

BRIEF DESCRIPTION OF THE FIGURES

Further advantages and features of the invention will become apparent from reading the description, which is illustrated using the following figures:

FIG. 2A shows images formed by a microlenses array in a detection plane of a wavefront analysis device according to the present description, according to one example;

FIG. 2B shows an image formed on an imaging detection plane of an imaging system, in a microscopic imaging system according to the present description, according to one example;

DETAILED DESCRIPTION OF THE INVENTION

Figure 1:
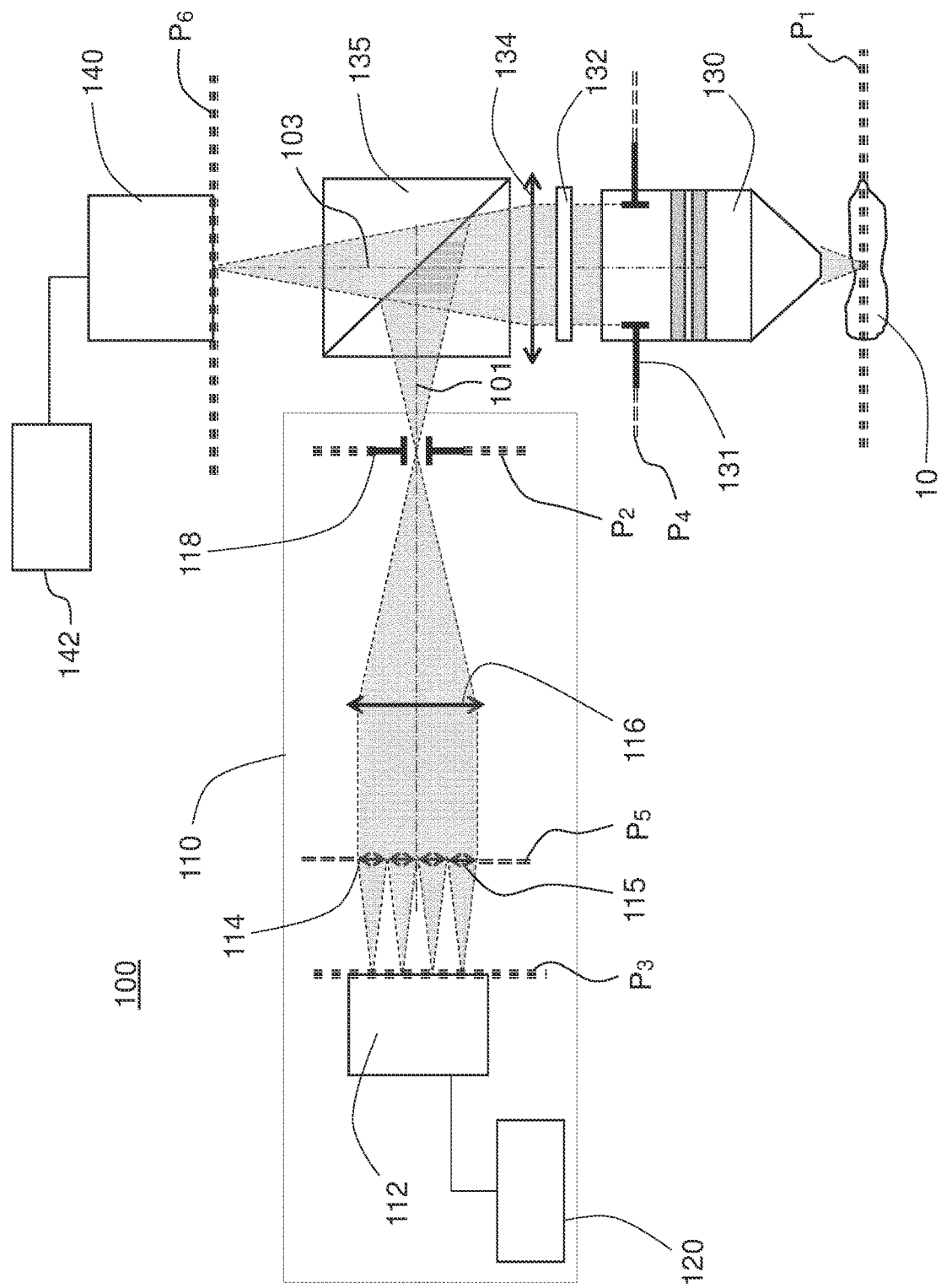
FIG. 1 shows a diagram illustrating an example of a wavefront analysis device according to the present description, connected to a microscopic imaging system.

FIG. 1 schematically illustrates an example of a wavefront analysis device 110 according to the present description, connected to a fluorescence microscopic imaging system 100 with optical sectioning.

The fluorescence microscopic imaging system 100 with optical sectioning comprises an illumination path (not shown in FIG. 1) for illuminating an optical section of a volumetric and fluorescent object 10.

The microscopic imaging system 100 also comprises an imaging path 103 and an analysis path 101 comprising the wavefront analysis device 110.

The imaging path 103 comprises, in the example of FIG. 1, a microscope objective lens 130 comprising a pupil 131 in a pupil plane $P_4$, a focusing optic 134, a fluorescence filter 132, an imaging detector 140 comprising a detection plane $P_6$, a processing unit 142 for processing signals acquired by the detector 140.

Depending on the type of microscopic imaging system (for example, light-sheet or multiphoton), the imaging detector 140 can be a two-dimensional detector, for example, a CCD (Charge Coupled Device) camera or a high-sensitivity CMOS (Complementary Metal Oxide Sensor) camera, such as, for example, sCMOS cameras, or a spot detector (for example, a photomultiplier).

The object 10 of interest is positioned in the vicinity of a focal plane $P_1$ of the microscope objective lens 130. The object 10 is, for example, a transparent or semi-transparent sample, such as a fluorescent biological object, and the focal plane $P_1$ of the microscope objective lens 130 is, for example, located at a non-zero distance from the surface of the object 10, so as to produce an image of a plane located in depth.

The microscopic imaging system 100 is a fluorescence imaging system with optical sectioning, i.e. a microscope allowing, using different techniques, selection of the light originating solely from an optical section perpendicular to the optical axis of the microscope objective lens. The optical section is located in the focal plane of the objective lens, the thickness of which can be less than the depth of field of the microscope objective lens. Several technical approaches exist for producing an optical section within a fluorescence microscope, such as, for example, light-sheet fluorescence microscopy and multiphoton fluorescence microscopy, embodiments of which will be described with reference to FIGS. 4 and 5. For the sake of simplicity, the illumination path of the object comprising means for generating a fluorescence optical section are not shown in FIG. 1.

The fluorescence filter 132 is a spectral filter allowing only the spectral band corresponding to the emission of fluorescence to be selected, in order to remove the excitation light that is possibly backscattered by the object. It can be a high-pass filter, a low-pass filter or a band-pass filter, depending on the relative spectral features between the excitation beam and the fluorescence emission beam.

The focusing optic 134 allows an image to be formed of an optical section superimposed with the focal plane $P_1$ on the imaging detection plane $P_6$. The focusing optic 134 can comprise one or more lenses, often called "tube lens(es)", and has features which, combined with the features of the imaging detector 140, in particular the size of an elementary detector or pixel of the imaging detector 140, allow sampling, by the detector 140, of the focal plane $P_1$ without a spectrum overlap effect, i.e. meeting the correct sampling conditions defined by the Shannon theorem.

The microscopic imaging system 100 also comprises a beam splitter element 135 allowing a portion of the fluorescence light emitted by the object to be taken from the imaging path 103 in order to send it toward the wavefront analysis device 110 on the analysis path.

According to one or more embodiments, the beam splitter element 135 comprises a beamsplitter cube or a beamsplitter plate, allowing transmission (or reflection) of a proportion of the fluorescence light originating from the object toward the imaging detector 140 and reflection (or transmission) of the remainder of the fluorescence light originating from the object toward the wavefront analysis device 110, with this proportion being 50%, for example.

According to one or more embodiments, the beam splitter element 135 comprises a plate or a dichroic cube, allowing transmission (or reflection) of a first spectral band of the fluorescence light originating from the object toward the imaging detector 140 and reflection (or transmission) of a second spectral band of the light originating from the object toward the wavefront analysis device 110, with these two spectral bands not having any overlap. For example, the use of a dichroic type beam splitter element is implemented concomitantly with the use of one or more fluorescence excitation sources and two types of fluorescent markers on the object, so as to obtain two separate fluorescence emission spectra. This thus avoids removing a signal useful for forming the image by the imaging detector 140 for the purpose of wavefront measurement. Thus, the photometric balance is optimal both on the imaging path 103 and on the analysis path 101. For example, in the case of a biological object such as the brain of animals models used in neuro-imaging (drosophila, zebra fish), an anatomical fluorescent marker can be used for measuring the wavefront by the wavefront analysis device 110, and a specific fluorescent marker can be used for the imaging, for example, a marker of the calcium activity associated with the response of the individual neurons, with these 2 markers emitting a fluorescent signal in 2 separate spectral hands.

The wavefront analysis (or measurement) device 110 shown in FIG. 1 comprises a two-dimensional detector 112 with a detection plane $P_3$, configured to detect light signals originating from a matrix 114 of microlenses 115, said matrix being arranged in an analysis plane $P_5$. The wavefront analysis device 110 also comprises an optical relay system 116 configured to optically conjugate the analysis plane $P_5$ and the pupil plane $P_4$ of the microscope objective lens 130, a field diaphragm 118 and a processing unit 120 for processing signals originating from the detector 112.

The two-dimensional detector 112 is, for example, a CCD or CMOS type two-dimensional camera configured to detect fluorescence light in a given spectral band, originating from the object. Typically, in fluorescence microscopy, fluorescent markers that are used emit in a visible or near infrared spectral hand, for example, between 400 and 900 nm. However, it is possible to adapt the sensitivity of the detector to other spectral bands if necessary, by using other detection technologies, such as, for example, other light-sensitive materials on the pixels of the two-dimensional detector. For example, InGaAs is a material that is sensitive between 0.9 μm and 1.7 μm for far infrared, in which spectral range numerous fluorescent markers are being developed due to the greater penetration depth of light, in particular in scattering environments.

The microlenses array 114 comprises a two-dimensional arrangement of optical focusing elements 115 arranged in an analysis plane $P_5$, for example, arranged in a two-dimensional matrix. In particular, each optical focusing element 115, or microlens, is characterized by the same focal distance $f_m$, as well as the same pupil size $d_m$, with the pupil size being defined as a function of the shape of the microlenses. The microlenses array 114 can be produced using different techniques, including, but not exclusively, machining a substrate made up of an optical material such as glass, photolithography applied to a light-sensitive resin deposited onto an optical substrate, the iterative deposition of optical material on a substrate allowing an array of Fresnel lenses to be formed, or pressing plastic optical material using a mold. The microlenses typically have a round pupil, with $d_m$ in this case corresponding to its diameter, or a square pupil, with $d_m$ in this case corresponding to its side. Other pupil geometries are possible depending on the technology that is used, such as, for example, hexagonal pupils. Preferably, a matrix of joined, square microlenses will be used, with the joining aspect of this geometry allowing all the incident light to be used, unlike round, non-joined microlenses. In order to maximize transmission efficiency, an anti-reflection treatment is generally used that corresponds to the spectral usage band of the microlenses array. The microlenses array 114 is positioned at the distance $f_m$ relative to the two-dimensional detector 112, with each microlens forming an image in the detection plane $P_3$.

The beam splitter element 135 allows an intermediate image plane $P_2$ to be defined in the wavefront analysis device 110 that is conjugated with the object focal plane $P_1$. The field diaphragm 118 is arranged in the intermediate focal plane $P_2$. The optical relay system 116, in combination with the microlenses array 114, allows an optical conjugation to be carried out between the plane $P_2$ and the detection plane $P_3$, at a magnification that is defined by the ratio of the focal lengths of the optical relay system 116 and of the microlenses array 114. Furthermore, the optical relay system 116, in combination with the focusing optic 134 (tube lens), allows an optical conjugation to be carried out between the pupil plane $P_4$ of the microscope objective lens 130 and the analysis plane $P_5$ (plane of the microlenses array), at a magnification that is defined by the ratio of the focal lengths of the optical relay system 116 and of the focusing optic 134.

The field diaphragm 118, located in the intermediate image plane $P_2$, allows the size of the field-of-view imaged by each microlens 115 of the microlenses array 114 to be limited. According to an advantageous embodiment, the dimensions and the geometry of the field diaphragm 118 are selected so that no overlap is possible between 2 adjacent images originating from adjacent microlenses of the microlenses array 114. For example, for square microlenses, with a side $d_m$, and an optical relay system 116 with a focal length of $f_c = 3f_m$, it is possible to define a field diaphragm 118 that is square and has a side that is less than or equal to $3d_m$. The field diaphragm is part of the wavefront analysis device 110 and therefore not part of the analysis path 101, but it is not part of the imaging path 105, so as to avoid minimizing the field-of-view imaged by the imaging detector 140.

The processing unit 120 is configured to process the signals originating from the detector 112, and in particular to carry out all operations on these signals in order to measure the wavefront originating from an optical section of the object, i.e. to determine a parameter characteristic of the wavefront.

The processing unit 120 is generally configured to implement computation and/or processing steps implemented in methods according to the present application. In general, when the present description refers to computation or processing steps for particularly implementing steps of methods, it is understood that each computation or processing step can be implemented by software, hardware, firmware, microcode or any suitable combination of these technologies. When software is used, each computation or processing step can be implemented by computer program instructions or by the software code. These instructions can be stored or transmitted to a computer-readable storage medium (or processing unit) and/or can be executed by a computer (or processing unit) in order to implement these computation or processing steps.

Of course, the processing unit 120 and the processing unit 140 can be consolidated within the same unit, for example, a computer.

Each microlens 115 of the microlenses array 114 thus forms an image on the detection plane $P_3$ of the detector 112 of an optical section of a fluorescent, in a field-of-view defined by the field diaphragm 118, as previously described. When the object and/or the optical imaging system do not have any aberration, each microlens forms an image on the detection plane of an optical section of the object centered on the optical axis of the considered microlens. When the plane $P_1$ is located deep in a heterogeneous object, optical aberrations are present, particularly in the pupil 131, corresponding to a non-flat wavefront. In this case, a transverse shift of each image formed by each microlens of the matrix 115 is observed on the detection plane $P_3$, with this shift being proportional to the local shift of the wavefront on the corresponding microlens, i.e. to the slope of the wavefront. Since the planes $P_5$ and $P_4$ are conjugated, each of these images corresponds to the image formed by the detector 140 of the imaging path 103, but through a portion of the pupil 131, the portion corresponding to the image of a microlens of the matrix $P_3$ by the optics 116 and 134. This shift can be viewed in a similar way to a Shack-Hartmann wavefront analyzer, for which the shift of a diffraction spot is observed that originates from each microlens and not from an image, with this type of sensor being used with a point source.

The geometrical effect produced on the detection plane of a wavefront analysis system by an imperfect wavefront at the scale of a microlens 115 of the microlenses array 114, as well as an example of advantageous dimensioning of the microlenses, will be described in further detail with reference to FIG. 8.

By way of an illustration, FIG. 2A shows an image 202 showing the diffraction spots formed by a microlenses array in a Shack-Hartmann type wavefront analyzer and an image 204 showing the images formed by the microlenses of a microlenses array in a wavefront analyzer according to the present description. The image 206 illustrates a magnified image formed by a microlens. FIG. 2B shows the image of the same object formed on the detector of the imaging path. In these examples, the object is a HeLa type fluorescent cell including a fluorescent marker of tubulin and the imaging system is of the light-sheet type. In this example, the microlenses are joined together and square and have a ratio of 15 between their focal distance and their side, which corresponds to a numerical aperture that is substantially less than that of the microscope objective lens, which explains the loss of resolution of the images formed by the microlenses, of which the image 206 is an example. For this reason, the images formed by the microlenses carry out low-pass filtering of the spatial frequencies of the object through a comparison with the image formed on the detector of the imaging path. In this example, the surface of the analysis field-of-view defined by the field diaphragm approximately corresponds to a quarter of the surface of the field-of-view imaged by the microscope.

Measuring all the shifts of the images formed by the set of microlenses allows, using a processing unit 120, a two-dimensional map of slopes of the wavefront in the pupil plane $P_4$ to be deduced. Using numerical integration it is possible to deduce a map of the wavefront therefrom. The measurement of the shifts of the images formed by the microlenses is typically carried out by cross-correlation operations of each image relative to a reference image. This reference image is defined, for example, as the image formed by a reference microlens, for example, a central microlens of the microlenses array 114. By limiting the field-of-view imaged by each microlens on the detection plane $P_3$, the field diaphragm 118 avoids overlapping images originating from adjacent microlenses likely to introduce errors during the cross-correlation computation.

The wavefront analysis device 110, when it is implemented within a fluorescence microscope with optical sectioning, as illustrated in FIG. 1, for example, allows a wavefront measurement to be carried out without requiring the presence of a point source within the object, as is generally the case, for example, with the use of a Shack-Hartmann type wavefront analyzer.

When it is implemented within a fluorescence microscope with optical sectioning, the wavefront analysis device 110 allows a measurement to be carried out of the optical defects on an analysis field-of-view defined by the field diaphragm 118. When the analysis field-of-view has similar dimensions, or is smaller than an isoplanetic patch, the wavefront measurement is valid irrespective of the point of the field-of-view. When the dimensions of the analysis field-of-view are greater than an isoplanetic patch, the wavefront measurement corresponds to the measurement of an average wavefront on the field-of-view defined by the diaphragm 118.

According to one or more embodiments, the field diaphragm 118 is referred to as "active", i.e. its dimensions and/or its position in the plane $P_2$ are variable.

Thus, the field diaphragm can, according to one example, have variable dimensions. For example, for a square transmission field diaphragm made up of 4 opaque plates arranged facing each other in pairs so as to form a square transparent zone, it is possible to arrange these plates on movable elements, which may or may not be motorized, allowing the relative distance between 2 plates located facing each other to be adjusted. A variable aperture of the field diaphragm allows an isoplanetic patch of an object to be determined, in a zone of the imaging field-of-view, for example, by carrying out a series of wavefront measurements for a steadily decreasing size of the field diaphragm. When the wavefront between 2 successive measurements stops varying, the size of the field diaphragm corresponding to the first one of the 2 measurements corresponds to the size of the isoplanetic patch of the object in the considered zone.

The field diaphragm 118 can also, according to one example, have a variable position in the plane $P_2$. For example, the variable position is obtained by motorizing the transverse position, for example, by means of piezoelectric motors or stepper motors.

By combining a variable position of the field diaphragm 118 with variable dimensions, it is possible to determine the dimensions of the isoplanetic patch at different zones of the field-of-view and to determine the optical defects of the wavefront in the analysis plane, for the different zones of the imaging field-of-view. Advantageously, dimensions are selected for the field diaphragm 118 that are less than those of the isoplanetic patch determined at each zone.

Figure 3:
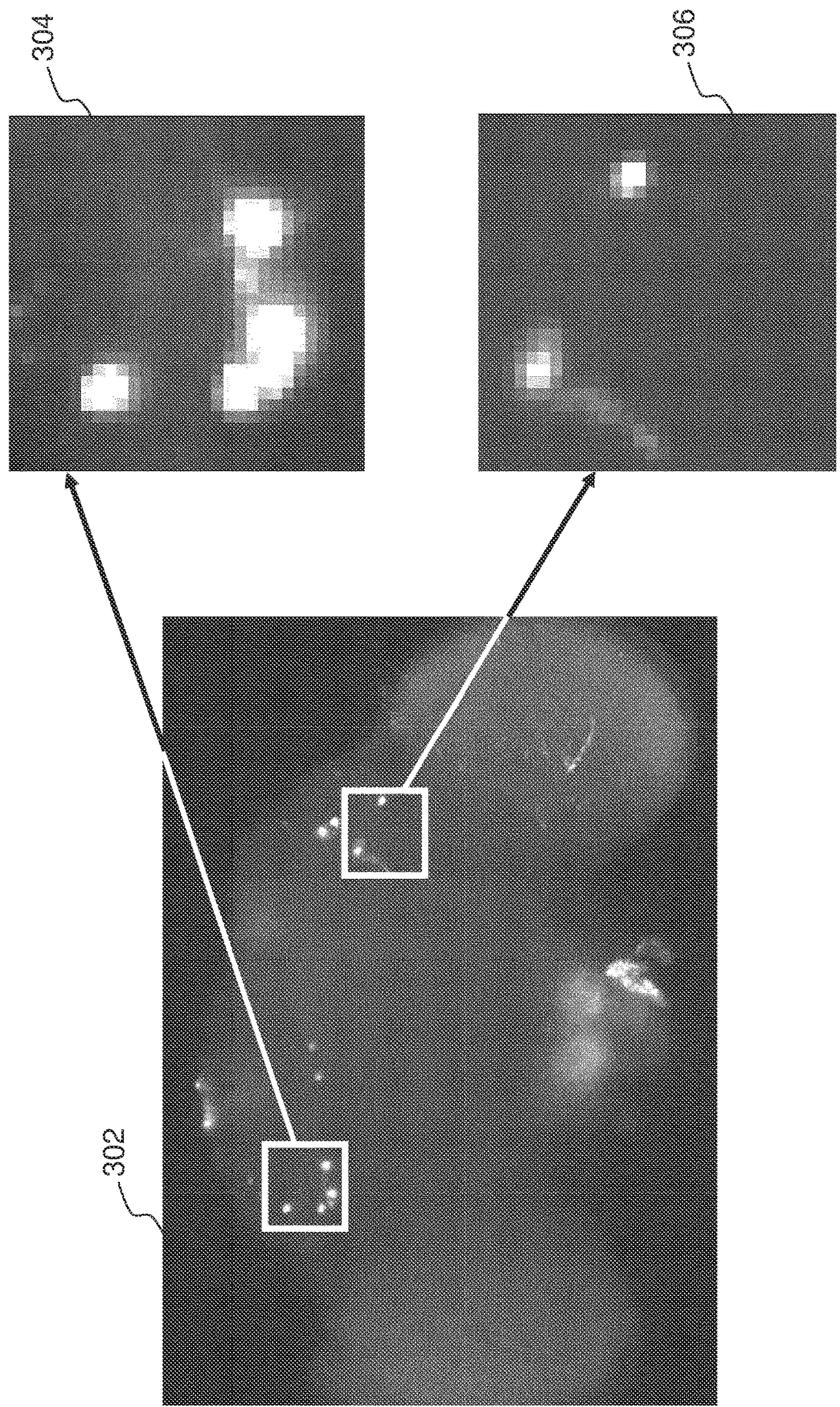
FIG. 3 shows an image of a biological object formed on an imaging detection plane of an imaging system, as well as images formed in a detection plane by a microlenses array of a wavefront analysis device according to one example of the present description, for two analysis field-of-views with different sizes and positions defined by the sizes and positions of the field diaphragm.

FIG. 3 thus shows an image 302 of a biological object formed on an imaging detection plane $P_6$ of an imaging system, as well as images 304, 306 formed in the detection plane $P_3$ of a wavefront analysis device according to one example of the present description, by a microlenses array, for two analysis field-of-views with different sizes and positions that are defined by the sizes and positions of the field diaphragm.

For biological objects in neuroimaging (drosophila, mouse, zebra fish brain), the typical imaging field-of-view is 400 μm to 500 μm on the side. A corresponding "average" isoplanetic patch is approximately 150 μm on the side (reference available if required).

Figure 4:
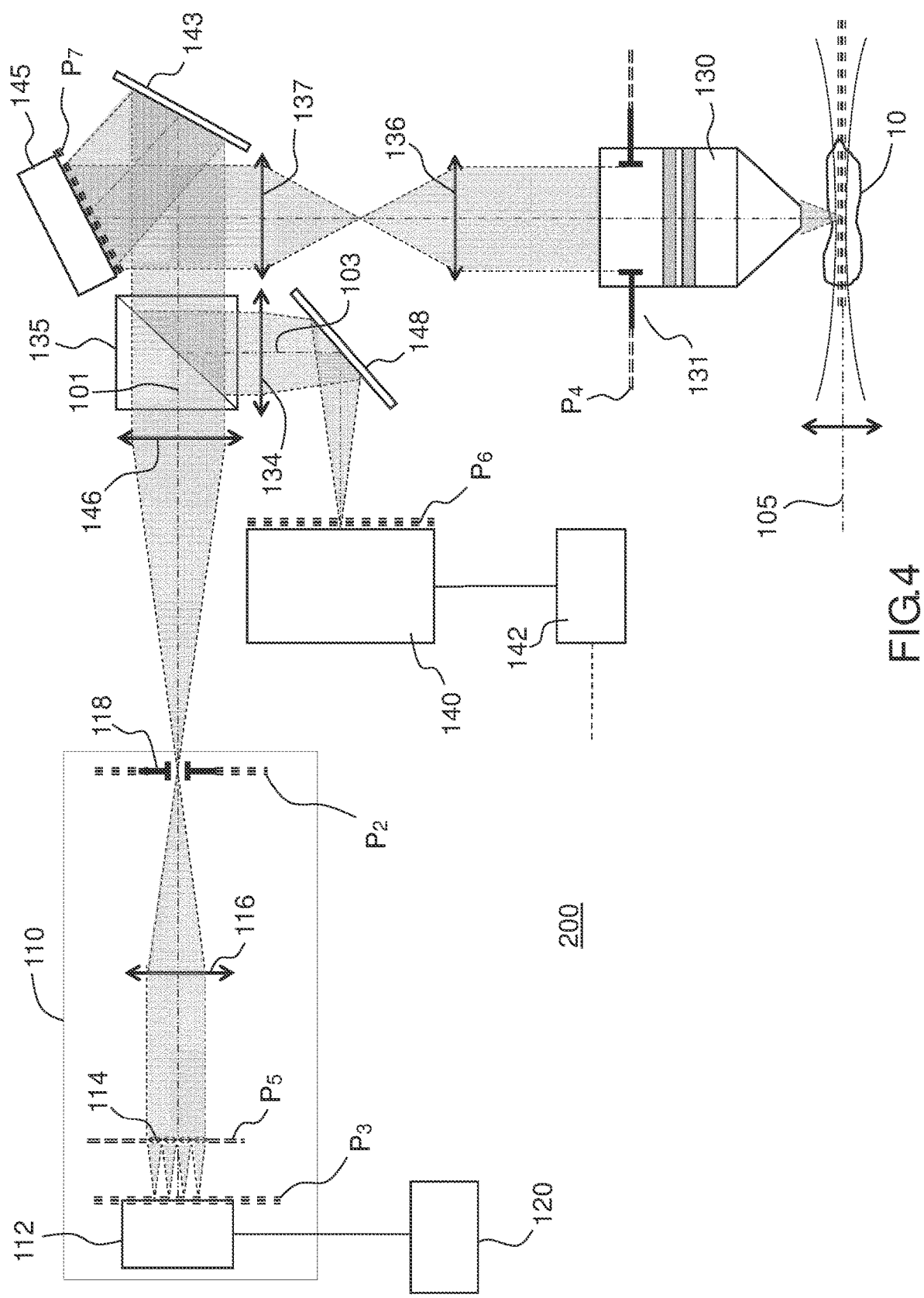
FIG. 4 shows a diagram illustrating an example of a "light-sheet" type fluorescence microscopic imaging system according to the present description.

FIG. 4 shows a diagram illustrating an example of a "light-sheet" type fluorescence microscopic imaging system 200, according to the present description.

The fluorescence microscopic imaging system 200 comprises elements similar to those described with reference to FIG. 1, referenced in FIG. 4 with identical reference signs, and not reproduced here to avoid overcomplicating the description.

In light-sheet fluorescence microscopy, the illumination path 105 is configured to form an optical section by transverse illumination of the object. The illumination path can comprise one or more light sources (not shown in FIG. 4) for emitting one or more excitation beams that can be emitted in different spectral bands. A fluorescence excitation beam forms a thin, the thickness of which is generally substantially similar to the depth of field of the microscope objective lens, and incident light plane on the object in a direction perpendicular to the optical axis of the microscope objective lens. The excitation beam does not pass through the sample outside the focal plane $P_1$ of the objective lens 130, thus avoiding the transmission of a spurious fluorescence signal.

In the example illustrated in FIG. 4, the "light-sheet" type fluorescence microscopic imaging system comprises a correction device 145 with a correction plane $P_7$ common to the analysis path 101 and to the imaging path 103. Correcting the wavefront by means of the correction device allows the quality of the image formed on the detection plane $P_6$ of the detector 140 to be improved, in particular when the focal plane of the microscope objective lens is located deep in the object, thanks to the compensation of the optical defects induced by the inhomogeneities of the object between its surface and said focal plane.

The microscopic imaging system 200 illustrated in FIG. 4 further comprises, in a common part of the analysis and imaging paths, an afocal optical system 136, 137. It also comprises, on the imaging path 103, the tube lens 134, allowing the image to be formed on the imaging detection plane $P_6$ and, on the analysis path 101, a lens 146 for forming the intermediate image plane $P_2$, in which the field diaphragm 118 of the wavefront analysis device 110 is arranged.

Figure 5:
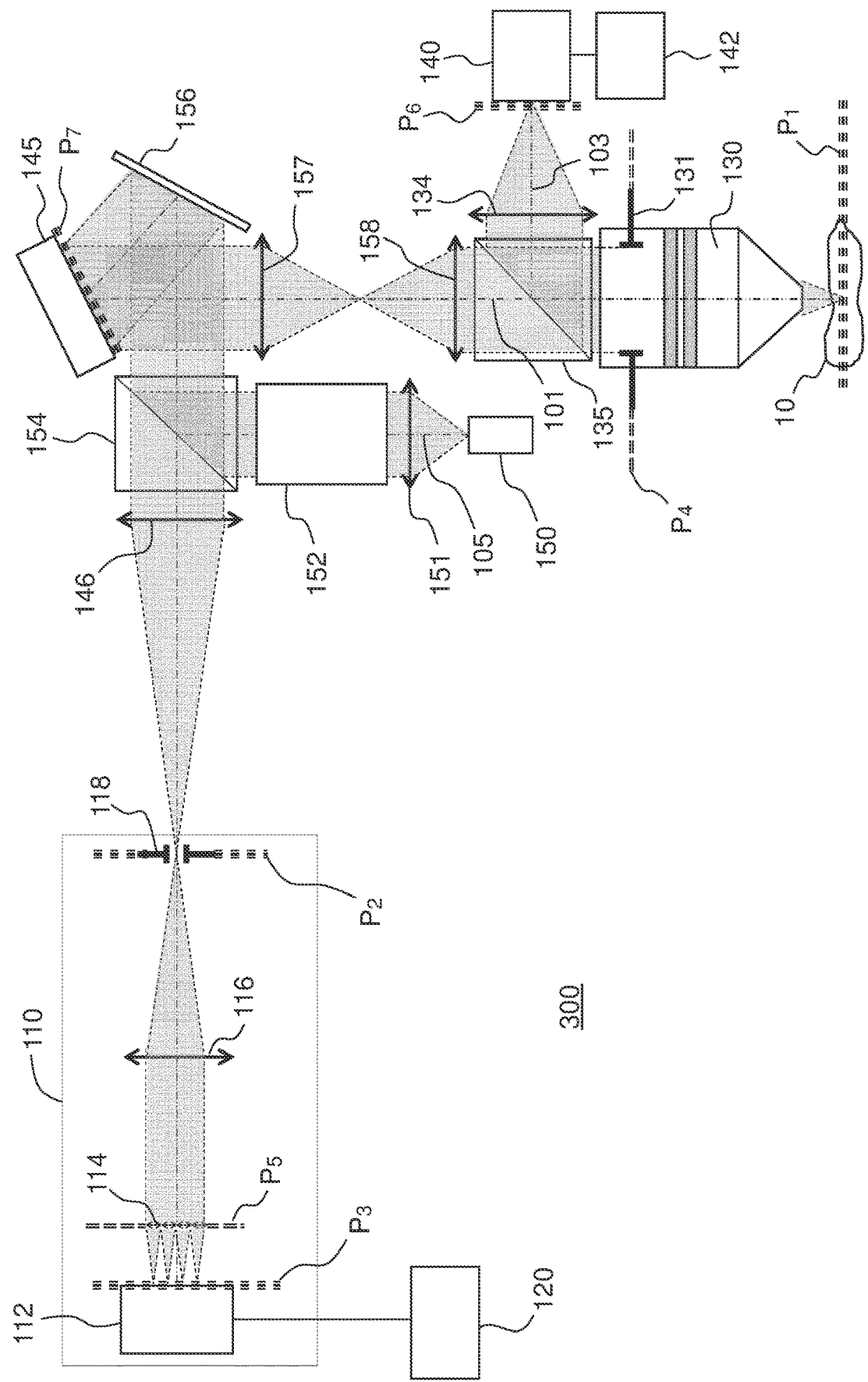
FIG. 5 shows a diagram illustrating an example of a "muitiphoton" type fluorescence microscopic imaging system according to the present description.

FIG. 5 shows a diagram illustrating an example of a "multiphoton" type fluorescence microscopic imaging system 300 according to the present description.

The fluorescence microscopic imaging system 300 comprises elements similar to those described with reference to FIG. 1, referenced in FIG. 5 with identical reference signs, and not reproduced here to avoid overcomplicating the description.

In multiphoton fluorescence microscopy, a fluorescence emission is used that is characterized by a non-linear relationship with respect to the excitation beam: the fluorescence signal of interest is only emitted when a minimum power density is achieved locally. This condition is typically fulfilled only when the excitation beam is focused, namely in the focusing plane of the microscope objective lens, which intrinsically prevents the emission of a spurious fluorescence signal.

Thus, in the example illustrated in FIG. 5, the illumination path 105 comprises one or more laser sources 150 for emitting ultrashort pulses, optionally with one or more collection optics 151, with the microscope objective lens 130 allowing each pulse to be focused on a focusing point of the focal plane $P_1$ of the objective lens, in order to form a multiphoton fluorescence emission. The illumination path 105 further comprises a scanning device 152 configured to transversely scan the focusing point in the focal plane $P_1$. In the example of the microscopic imaging system illustrated in FIG. 5, the detector 140 comprises, for example, a one-dimensional detector, for example, a photomultiplier, configured to detect the light energy emitted by the object 10 and sent by the splitter element 135 for each position of the focusing point. Thus, the detector 140 cooperates with the scanning device 152 in order to form a two-dimensional image of the object.

According to one or more embodiments, the multiphoton fluorescence microscopic imaging system 300 comprises a correction device 145 with a correction plane $P_7$. In this example, the correction plane $P_7$ is common to the analysis path 101 and to the illumination path 105. Correcting the wavefront by means of the correction device allows the quality of the focusing in the object to be improved, and consequently allows the fluorescence signal at each point of the image to be increased, thanks to the compensation of the optical defects induced by the inhomogeneities of the object between its surface and said focal plane as each pulse passes through.

The microscopic imaging system 300 illustrated in FIG. 5 further comprises, on the common portion of the analysis and illumination paths, an afocal optical system 157, 158. It also comprises, on the imaging path 103, the tube lens 134 that allows the image to be formed on the imaging detection plane $P_6$ and, on the analysis path 101, a lens 146 for forming the intermediate image plane $P_2$, in which the field diaphragm 118 of the wavefront analysis device 110 is arranged.

Irrespective of the fluorescence microscopic imaging system with optical sectioning implemented in the present description, the applicant has shown that the use of cross-correlation computations for determining the relative positions of the images formed by the microlenses leads to the measurement precision of these positions becoming dependent on certain features of said images, in particular the size and the contrast of the intensity patterns forming these images.

Indeed, by way of an example, a set of uniform images formed by the microlenses does not allow a precise inter-correlation computation to be carried out, with the correlation operation not having any structure that allows a precise determination of the position of the correlation peak. This example can, for example, occur for a homogenous object, or even for an object only made up of details, the characteristic sizes of which are less than the minimum size that can be imaged by the microlenses of the microlenses array.

Figure 6:
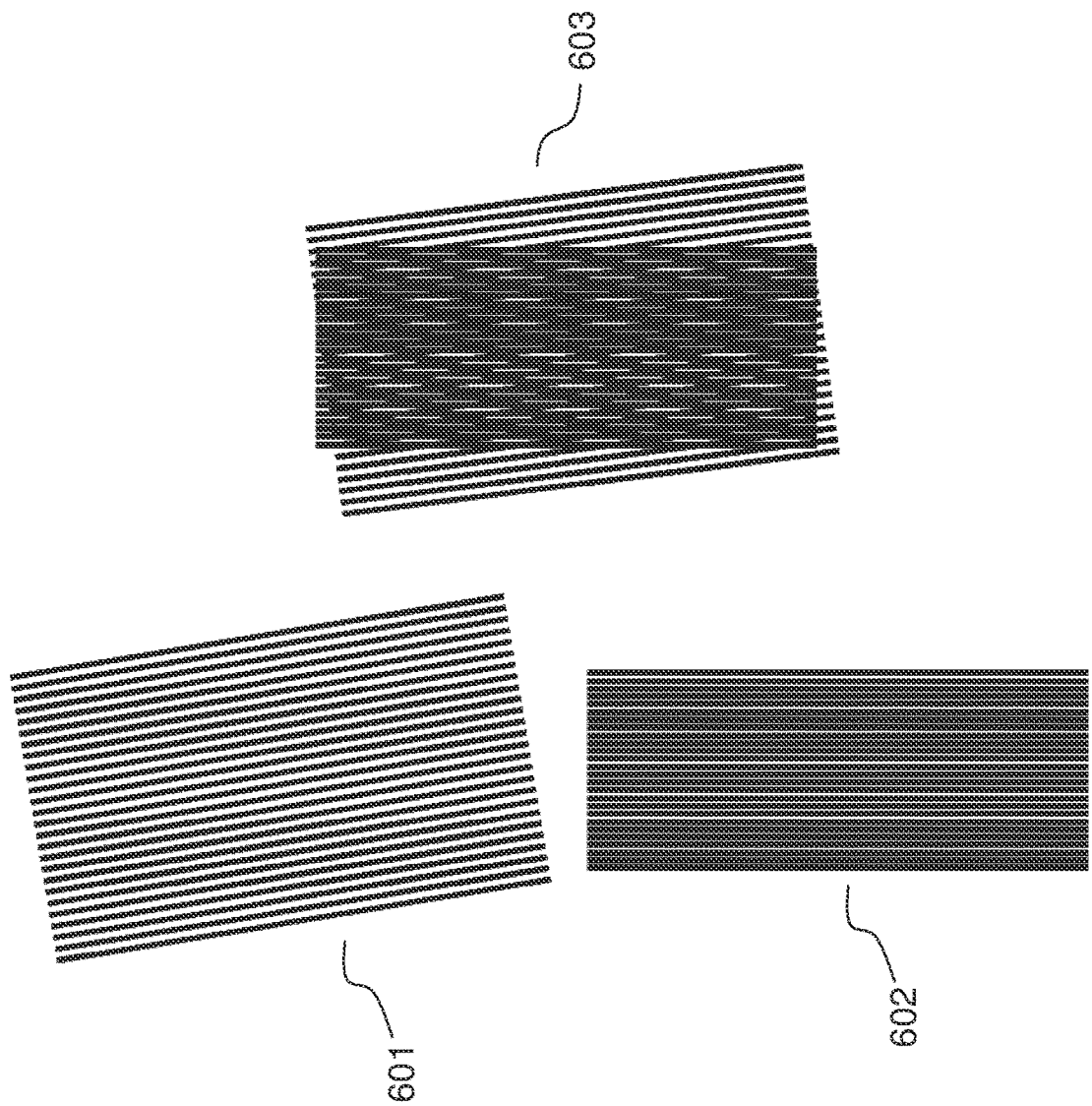
FIG. 6 shows a diagram illustrating an example of the appearance of intensity patterns through a Moiré phenomenon resulting from the superimposition of two intensity patterns comprising different spatial frequencies respectively corresponding to a spatial frequency of microstructures of an object and to a spatial frequency of a structured field diaphragm.

FIG. 6 and FIG. 7 illustrate two embodiments of a microscopic imaging method according to the present description, allowing the processing of the images formed in the detection plane $P_3$ of the wavefront analysis device 110 according to the present description to be improved.

FIG. 6 illustrates a first example, in which the field diaphragm 118 is structured. For example, the field diaphragm is a transmission field diaphragm and the transmission is structured, in one direction, to form a regular alternation with a given spatial frequency of transmission zones and of opaque zones. According to another example, the field diaphragm is a reflection field diaphragm and the reflection is structured, in one direction, to form a regular alternation with a given spatial frequency of reflective zones and of non-reflective zones.

Thus, the image 602 in FIG. 6 shows an example of structured transmission of a field diaphragm according to a regular alternation of transparent zones and of opaque zones in one direction, defining a spatial frequency $k_0$.

The image 601 shows an image, in the plane of the field diaphragm ($P_2$, FIG. 1), of a theoretical fluorescent object that will be made up of a regular alternation of fluorescent structures and of non-fluorescent structures in one direction, with a spatial frequency k.

The image 603 shows the superimposition of two intensity patterns 601 and 602. When the two periodic intensity patterns and different spatial frequencies are superimposed in the plane of the field diaphragm, a Moiré phenomenon occurs that is visible in a plane conjugated with said plane of the field diaphragm. As shown on the image 603, the Moiré phenomenon reveals an additional periodic pattern within a plane conjugated with the field diaphragm, for which additional pattern the spatial frequency corresponds to the vector difference of the two spatial frequencies of the initial patterns, that is a spatial frequency that is substantially less than the spatial frequencies of the two initial patterns.

In practice, for any object, the spatial frequency content of the image of a plane of the object is complex and is made up of many spatial frequencies. Some complex microscopic objects, in particular biological objects such as, for example, arrays of micro-tubules, can be solely made up of structures with very small characteristic sizes, and therefore with very high spatial frequencies. The wavefront analysis device as described in the present description produces, in the detection plane, a set of conjugated images of the plane of the field diaphragm, in particular through a microlenses array. This microlenses array is made up of individual microlenses, the numerical aperture of which is substantially less than the numerical aperture of the microscope objective lens, so as to provide a compromise between the field-of-view imaged by each microlens and the sensitivity of the movement measurement of the images formed by the microlenses by cross-correlation computation. This results in images of the plane of the field diaphragm produced by the microlenses, the spatial frequency content of which is substantially reduced on the high spatial frequencies, in a manner that is directly proportional to the numerical aperture of the microlenses. Thus, for objects as previously described, it is possible that the images produced by the microlenses no longer contain enough details to obtain precise cross-correlation computations. In this case, by positioning a structured field diaphragm, for example, in a pattern as illustrated in 602, the images produced by the microlenses reveal an additional intensity pattern according to a Moiré phenomenon, as illustrated according to an example on the image 603, for which at least one spatial frequency is likely to be transmitted in the detection plane $P_3$. This additional pattern, which is characteristic of the object, advantageously allows an intercorrelation computation to be carried out that is substantially more precise than in the absence of any Moiré pattern, in particular for objects such as those previously described.

When the image of the object does not correspond to an intensity pattern defining a unique spatial frequency, as shown in FIG. 6 per 601, the additional intensity pattern created by the Moiré phenomenon is a more complex pattern than the example shown in image 603.

For example, a transmission pattern (or reflection) of the field diaphragm can be selected with a determined spatial frequency so that the resulting Moiré pattern (image 603) has a frequency that is below a maximum spatial frequency $F_{max}$ transmitted by the microlenses. It is thus possible to improve the wavefront measurement precision for objects for which the majority of the spatial frequencies range between the maximum spatial frequency transmitted by the microlenses and two times this maximum spatial frequency. For square microlenses, with a side $d_m$, and a focal distance $f_m$, and for a central imaging wavelength $\lambda$, this maximum spatial frequency $F_{max}$ is given by $F_{max}=d_m/\lambda f_m$.

Figure 7B:
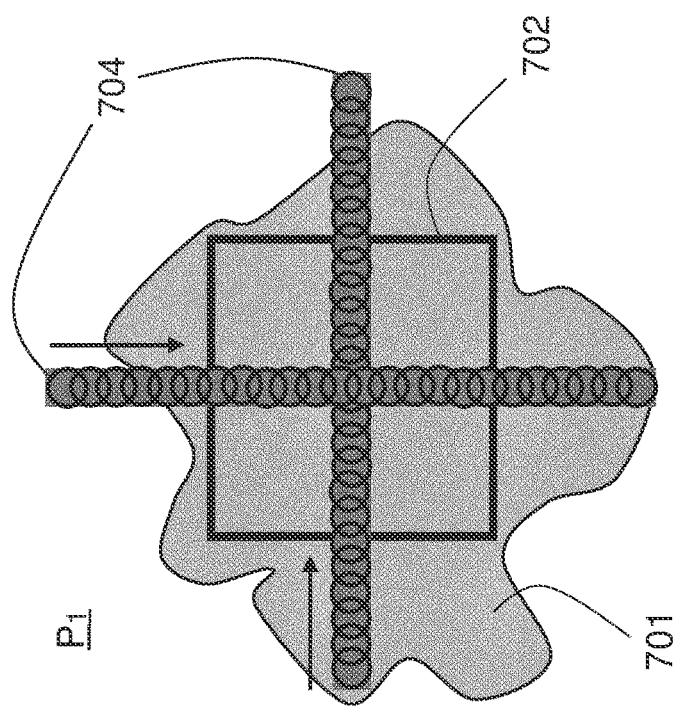
FIG. 7B shows a diagram illustrating an example of structured lighting of an object according to a cross-shaped two-dimensional pattern, in an example of a "multiphoton" type fluorescence microscopic imaging system according to the present description.
Figure 7A:
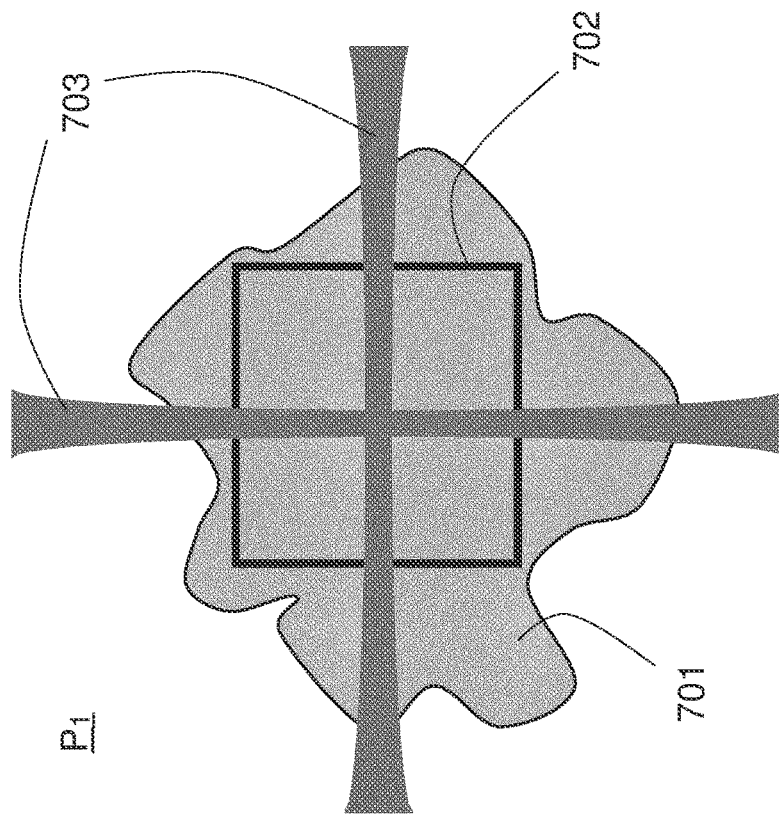
FIG. 7A shows a diagram illustrating an example of structured lighting of an object, according to a cross-shaped two-dimensional pattern, in an example of a "light-sheet" type fluorescence microscopic imaging system according to the present description.

FIGS. 7A and 7B illustrate a second example, in which an illumination of the object is structured. FIG. 7A describes a structured illumination in an imaging system according to the present description, of the light-sheet type and FIG. 7B describes a structured illumination in an imaging system according to the present description, of the multiphoton type.

FIG. 7A shows a diagram illustrating an example of a frontal representation, i.e. perpendicular to the optical axis, of an optical section 701 of an object in the focal plane $P_1$ of a microscope objective lens of a "light-sheet" type fluorescence microscopic imaging system with optical sectioning, as illustrated in FIG. 4, for example.

The surface 702 schematically shows the analysis field-of-view, the size of which is defined by the field diaphragm of a wavefront analysis device according to the present description. As previously disclosed, when the analysis field-of-view 702 corresponds to a homogeneous zone in terms of fluorescence intensity emitted by the object, it is difficult to obtain a precise intercorrelation computation between the images produced by the microlenses of the wavefront analysis device for determining the relative positions of said images, with a cross-correlation between two homogenous intensity patterns not resulting in a correlation peak that can be precisely spatially located. The applicant has shown that it is then possible to advantageously use structured lighting of the object at the optical section allowing a set of images to be obtained, which images are formed by the microlenses for which the lighting intensity pattern is present and allows an intercorrelation computation to be carried out that defines a two-dimensional correlation peak.

According to the example of FIG. 7A, corresponding to a simplified implementation, at least one additional source is used on the "light-sheet" type illumination path 105, which source is configured to illuminate the object using two beams 703, which are disposed, for example, in 2 perpendicular directions and the point of intersection of which is located in the surface 702. Any other lighting pattern comprising at least two non-parallel directions meets the lighting structure requirement as shown. Advantageously, the additional source implements illumination in accordance with a specific spectral band allowing fluorescence emission from a specific spectral band different from the fluorescence emission produced by illumination by the first source, which, combined with the use of a dichroic beam splitter between the imaging path and the wavefront analysis device, allows no light to be used that is intended for the imaging path for analyzing the wavefront and thus allows the contrast of the images formed by the microlenses to be maximized.

FIG. 7B shows a diagram illustrating an example of a frontal representation, i.e. perpendicular to the optical axis, of an optical section 701 of an object in the focal plane $P_1$ of a microscope objective lens of a "multiphoton" type fluorescence microscopic imaging system with optical sectioning, as illustrated in FIG. 5, for example.

Here again, the surface 702 represents the analysis field-of-view, the size of which is defined by the field diaphragm of a wavefront analysis device according to the present invention. As previously disclosed, when the analysis field-of-view 702 corresponds to a homogeneous zone in terms of fluorescence intensity emitted by the object, it is not possible to use an intercorrelation computation between the images produced by the microlenses of the wavefront analysis device to determine the relative positions of said images, with an intercorrelation between two homogeneous intensity patterns not resulting in a correlation peak that can be precisely spatially located. The applicant has shown that in this type of microscopic imaging system, it is also possible to use structured lighting of the object on the optical section in order to obtain a set of images formed by the microlenses for which the lighting intensity pattern is present and allows an intercorrelation computation to be carried out defining a two-dimensional correlation peak.

According to the example of FIG. 7B, corresponding to a simplified implementation, at least one additional source is used on the "multiphoton" type illumination path, which source is configured to illuminate the object in a pattern 704 comprising, in this example, two perpendicular directions and the point of intersection of which is located in the surface 702. Practically, for a "multiphoton" type microscope, this pattern is produced by sequential scanning of the focusing point of the additional source in the focal plane of the objective lens, typically using a pair of galvanometers. Any other lighting pattern comprising at least two non-parallel directions meets the structuring requirement of the lighting as shown. Advantageously, the additional source implements illumination in a specific spectral band allowing fluorescence emission of a specific spectral band different from the fluorescence emission produced by the illumination by the first source, which, combined with the use of a dichroic beam splitter between the imaging path and the wavefront analysis device, allows no light to be used that is intended for the imaging path for analyzing the wavefront and thus allows the contrast of the images formed by the microlenses to be maximized.

Figure 8:
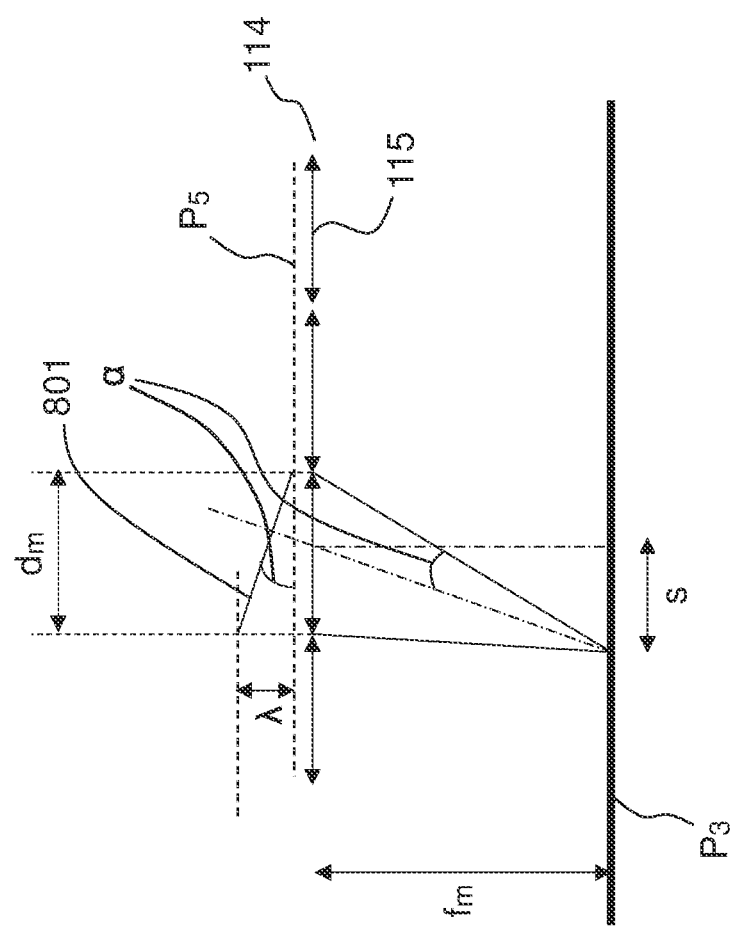
FIG. 8 shows a diagram illustrating the geometrical effect produced on the detection plane by a non-zero wavefront gradient at the scale of a microlens of a microlenses array of a wavefront analysis device according to the present description.

FIG. 8 shows a diagram illustrating the geometrical effect produced on the detection plane of a wavefront analysis system as described by the present invention using an imperfect wavefront at the scale of a microlens 115 of the microlenses array.

Assuming, for example, a microlenses array 114 comprising a set of adjacent microlenses with square pupils with a side $d_m$ and a focal distance $f_m$, as shown in one dimension in FIG. 8, for the sake of simplicity. Assuming a complex wavefront 801 incident in the analysis plane $P_5$ corresponding to the plane of the microlenses, such that on a microlens the deviation of the wavefront relative to a perfect flat wavefront corresponds to a wavelength $\lambda$ of the incident beam, as shown in FIG. 8.

For a wavefront analysis device as described in the present description, the spatial resolution of the analysis of the wavefront corresponds to a microlens. The local wavefront that can be measured by a microlens thus corresponds to an elementary wavefront forming an angle $\alpha$ with the analysis plane, such that $\alpha=\delta/d_m$, with $\delta$ being the local deviation of the wavefront relative to a reference wavefront, in this example a flat wavefront. Thus, for a local deviation of the wavefront relative to a flat wavefront equaling $\delta=\lambda$, the angle $\alpha$ equals $\alpha=\lambda/d_m$, with $\lambda$ being significantly lower than $d_m$. The diffraction spot formed at the focal point of the microlens on the detection plane $P_3$ is thus transversely shifted by a distance s, with the shift s being provided by:

$$s = \frac{\lambda f}{d}.$$

For a microlens 115, the size t of a diffraction spot, measured between the two first intensity minima located on either side of the maximum intensity, is given by:

$$t = \frac{2\lambda f}{d}.$$

It is known from the prior art that, for a two-dimensional detector, for example, a camera, made up of a two-dimensional arrangement of elementary detectors or pixels, it is possible to measure the position of an intensity pattern, such as a diffraction spot or a complex figure with a localization precision of up to one hundredth of a pixel for high contrast intensity patterns that are correctly sampled by the detector. In the case of the wavefront analysis device according to the present description, when the two-dimensional detector is designed so that a diffraction spot corresponds to two pixels in one direction, and for localization precision for an intensity pattern of one hundredth of a pixel, it is thus possible to measure the deviation of an incident wavefront on a microlens with a maximum precision of $\lambda/100$. Similarly, when the two-dimensional detector is designed so that a diffraction spot corresponds to two tenths of a pixel in one direction, and for localization precision of an intensity pattern of one hundredth of a pixel, it is thus possible to measure the deviation of an incident wavefront on a microlens with maximum precision of $\lambda/10$. In practice, measuring a wavefront with precision of less than $\lambda/10$ does not allow efficient use of said measurement for the purpose of characterizing an object or for imaging.

Thus, the applicant has shown that, advantageously, the wavefront analysis device according to the present invention can be designed so that a diffraction spot of a microlens of the microlenses array has a dimension, in one direction, ranging between 0.2 and 2 times the size of a pixel of the two-dimensional detector in the detection plane.

Even though it has been described using a certain number of embodiments, the wavefront analysis device and the microscopic imaging systems and methods using the wavefront analysis device include different variants, modifications and improvements that will be obvious to a person skilled in the art, with it being understood that these different variants, modifications and improvements form part of the scope of the invention as defined by the following claims.

BIBLIOGRAPHICAL REFERENCES

1. M. J. Booth et cal. "Adaptive optics for fluorescence microscopy", extracted from the following publication, "Fluorescence Microscopy: Super-resolution and other Novel Techniques", A. Cornea et al., Academic Press, 2014.
2. N. Ji "Adaptive optical fluorescence microscopy", Nature Methods 14, 374-380, 2017.
3. Azucena et al. U.S. Pat. No. 855,730 B2.
4. Betzig et al. published patent application US 2015/0362713.
5. K. Lawrence et al. "Scene-based Shack-Hartmann wavefront sensor for light-sheet microscopy", Proc. SPIE 10502, Adaptive Optics and Wavefront Control for Biological Systems IV, 2018.

The invention claimed is:

1. A wavefront analysis device, configured to be connected to a fluorescence microscopic imaging system with optical sectioning, equipped with a microscope objective lens comprising a pupil in a pupil plane, the wavefront analysis device comprising:
    a two-dimensional detector comprising a detection plane;
    a two-dimensional arrangement of a plurality of microlenses arranged in an analysis plane, each microlens of the plurality of microlenses being configured to form, on the detection plane, when the wavefront analysis device is connected to the fluorescence microscopic imaging system, an image of an object located in a focal plane of the microscope objective lens, with an analysis field-of-view;
    an optical relay system configured to optically conjugate the analysis plane and the pupil plane;
    a field diaphragm positioned in a plane optically conjugated with the detection plane and configured to define said analysis field-of-view;
    a processing unit configured to determine, based on a set of images formed by the plurality of microlenses, a two-dimensional map of a characteristic parameter of a wavefront in said analysis plane; and
    one or more optical elements allowing optical conjugation to be carried out between the plane of the field diaphragm and the detection plane,
    wherein each microlens among the plurality of microlenses comprises a pupil of a given shape, the field diaphragm having an identical shape to a shape of said pupil of each microlens, and
    wherein a plurality of dimensions of the field diaphragm are less than or equal to a plurality of dimensions of said pupil of each microlens divided by an optical magnification defined by the one or more optical elements.

2. The wavefront analysis device as claimed in claim 1, wherein each microlens among the plurality of microlenses has a square pupil and the plurality of microlenses are joined together.

3. The wavefront analysis device as claimed in claim 1, wherein the field diaphragm has variable dimensions.

4. The wavefront analysis device as claimed in claim 1, wherein the field diaphragm has a variable position in said plane optically conjugated with the detection plane.

5. The wavefront analysis device as claimed in claim 1, wherein the field diaphragm is spatially structured with a given spatial frequency in one direction.

6. The wavefront analysis device as claimed in claim 1, wherein the two-dimensional detector comprises a two-dimensional arrangement of elementary detectors and a diffraction spot of a microlens comprises, in one direction, between 0.2 and 2 elementary detectors.

7. A fluorescence microscopic imaging system with optical sectioning of a volumetric and fluorescent object comprising:
    an illumination path for an illumination of the object;
    an imaging path for imaging an optical section of the object, comprising a microscope objective lens with a pupil in a pupil plane and an imaging detector comprising an imaging detection plane, said optical section being superimposed on a focal plane of said microscope objective lens;
    an analysis path comprising said microscope objective lens and the wavefront analysis device as claimed in claim 1, configured to analyze a wavefront originating from the object, the analysis plane being conjugated with said pupil plane and the detection plane of the wavefront analysis device being conjugated with said focal plane of the microscope objective lens;

a beam splitter element for splitting the wavefront analysis device for analyzing optical defects from the imaging path.

8. The fluorescence microscopic imaging system as claimed in claim 7, wherein said beam splitter element is a dichroic element allowing light to be reflected in a first spectral band and light to be transmitted in a second spectral band, separate from the first spectral band.

9. The fluorescence microscopic imaging system as claimed in claim 7, further comprising a wavefront correction device comprising a correction plane optically conjugated with the pupil plane, said correction plane being included in the analysis path, the wavefront correction device being configured to correct a wavefront originating from the object and analyzed by the wavefront analysis device.

10. The fluorescence microscopic imaging system as claimed in claim 7, wherein the illumination path is configured to form said optical section by transverse illumination of the object.

11. The fluorescence microscopic imaging system as claimed in claim 7, wherein the illumination path comprises:
one or more laser sources for emitting ultrashort pulses, said microscope objective lens allowing each pulse to be focused at a focusing point of a focal plane of said microscope objective lens in order to form a multiphoton fluorescence emission;
a scanning device configured to transversely scan said focusing point.

12. A method for microscopic imaging of an object by means of a fluorescence microscopic imaging system with optical sectioning comprising:
illuminating the object along an optical section by means of an illumination path;
imaging said optical section of the object in a detection plane of an imaging detector by means of an imaging path comprising a microscope objective lens with a pupil in a pupil plane and said imaging detector; and
analyzing a wavefront originating from said optical section of the object by means of an analysis path comprising said microscope objective lens and a wavefront analysis device as claimed in claim 1, the analysis plane and the detection plane of the wavefront analysis device being respectively conjugated with the pupil plane and a focal plane of the microscope objective lens, the analysis path being split from the imaging path by means of a beam splitter.

13. The method as claimed in claim 12, wherein the illumination of the object comprises a first illumination for fluorescence excitation for the imaging path, and a second illumination for fluorescence excitation for the analysis path, the second illumination producing a structured illumination of the object according to a two-dimensional pattern.

* * * * *